United States Patent
Ooishi et al.

(10) Patent No.: US 7,716,951 B2
(45) Date of Patent: May 18, 2010

(54) METHOD FOR MANUFACTURING ARTICLE COMPRISING DEPOSITED FINE GLASS PARTICLES

(75) Inventors: Toshihiro Ooishi, Yokohama (JP); Motonori Nakamura, Yokohama (JP); Tomohiro Ishihara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 908 days.

(21) Appl. No.: 10/589,125

(22) PCT Filed: Feb. 9, 2005

(86) PCT No.: PCT/JP2005/001906

§ 371 (c)(1),
(2), (4) Date: Aug. 11, 2006

(87) PCT Pub. No.: WO2005/077849

PCT Pub. Date: Aug. 25, 2005

(65) Prior Publication Data

US 2007/0169514 A1   Jul. 26, 2007

(30) Foreign Application Priority Data

Feb. 12, 2004   (JP)   ............................. 2004-034899

(51) Int. Cl.
*C03B 37/07*   (2006.01)
(52) U.S. Cl. .......................................... 65/377; 65/421
(58) Field of Classification Search .................. 65/377, 65/421, 413, 415
See application file for complete search history.

(56) References Cited

U.S. PATENT DOCUMENTS 5,211,732 A    5/1993   Abbott et al.

(Continued)

FOREIGN PATENT DOCUMENTS

JP   3-228845   9/1991

(Continued)

OTHER PUBLICATIONS

International Preliminary Report on Patentability and Written Opinion of the International Searching Authority issued in International Patent Application No. PCT/JP2005/001906, dated Sep. 28, 2006.

*Primary Examiner*—Steven P Griffin
*Assistant Examiner*—Queenie Dehghan
(74) *Attorney, Agent, or Firm*—McDermott Will & Emery LLP (57) ABSTRACT

A method of producing a glass-particle-deposited body that has a small diameter variation and the like resulting from alteration of the deposition condition is offered. When the glass-particle-deposited body is produced, a burner row constituted by placing a plurality of burners is moved relative to a starting member, and glass particles ejected from the burners are deposited on the starting member. In the method of producing a glass-particle-deposited body, alteration of the deposition condition is performed during the course of the deposition of the glass particles on the starting member. The method of producing a glass-particle-deposited body has a feature in that the alteration of the deposition condition is performed at least twice and that the burner positions along the length of the starting member at which the deposition condition is altered are placed at intervals shorter than the intervals between burners.

9 Claims, 5 Drawing Sheets

U.S. PATENT DOCUMENTS

| | | | |
|---|---|---|---|
| 6,047,564 A | 4/2000 | Schaper et al. | |
| 6,324,871 B1 * | 12/2001 | Nakamura et al. | ............ 65/421 |
| 2003/0003228 A1 | 1/2003 | Ooishi et al. | |
| 2003/0070450 A1 * | 4/2003 | Nakamura et al. | ............ 65/377 |

FOREIGN PATENT DOCUMENTS

| | | |
|---|---|---|
| JP | 4-260618 | 9/1992 |
| JP | 10-120430 | 5/1998 |
| JP | 2000-44276 | 2/2000 |
| JP | 2000-272929 | 10/2000 |
| JP | 2001-504426 | 4/2001 |
| JP | 2002-220235 | 8/2002 |
| JP | 2003-081645 | 3/2003 |

* cited by examiner

PRIOR ART

METHOD FOR MANUFACTURING ARTICLE COMPRISING DEPOSITED FINE GLASS PARTICLES

RELATED APPLICATION

This application is a national phase of PCT/JP2005/001906 filed on Feb. 9, 2005, which claims priority from Japanese Application No. 2004-034899 filed on Feb. 12, 2004 disclosures of which Applications are incorporated by reference herein. The benefit of the filing and priority dates of the International and Japanese Applications is respectfully requested.

TECHNICAL FIELD

The present invention relates to a method of producing a glass-particle-deposited body.

BACKGROUND ART

The types of the method of producing a glass-particle-deposited body include an outside vapor deposition method (OVD method). In the OVD method, a burner is supplied with a glass-material gas, a combustible gas, a combustion-assisting gas, and an inert gas, glass particles are synthesized by a flame hydrolysis reaction or an oxidation reaction in a flame ejected from the burner, and the glass particles are deposited on a starting rod member (starting member) having superior corrosion and heat resistance to form a glass-particle-deposited body.

The types of the material for the starting member include glass, carbon, and alumina, for example. In addition, a starting member is also known that is composed of an eminently heat-resistive material having a heat- and corrosion-resistive coating. In the production of an optical fiber preform, a glass rod to become a part of the product, including the core, is sometimes used as the starting member.

In recent years, another OVD method has also been employed in which, in place of the glass-material gas, the glass particles themselves are fed to the burner so that the glass particles are ejected from the burner together with the flame to be deposited on the starting member. The two types of feeding methods may also be combined to carry out this process.

Figure 5:
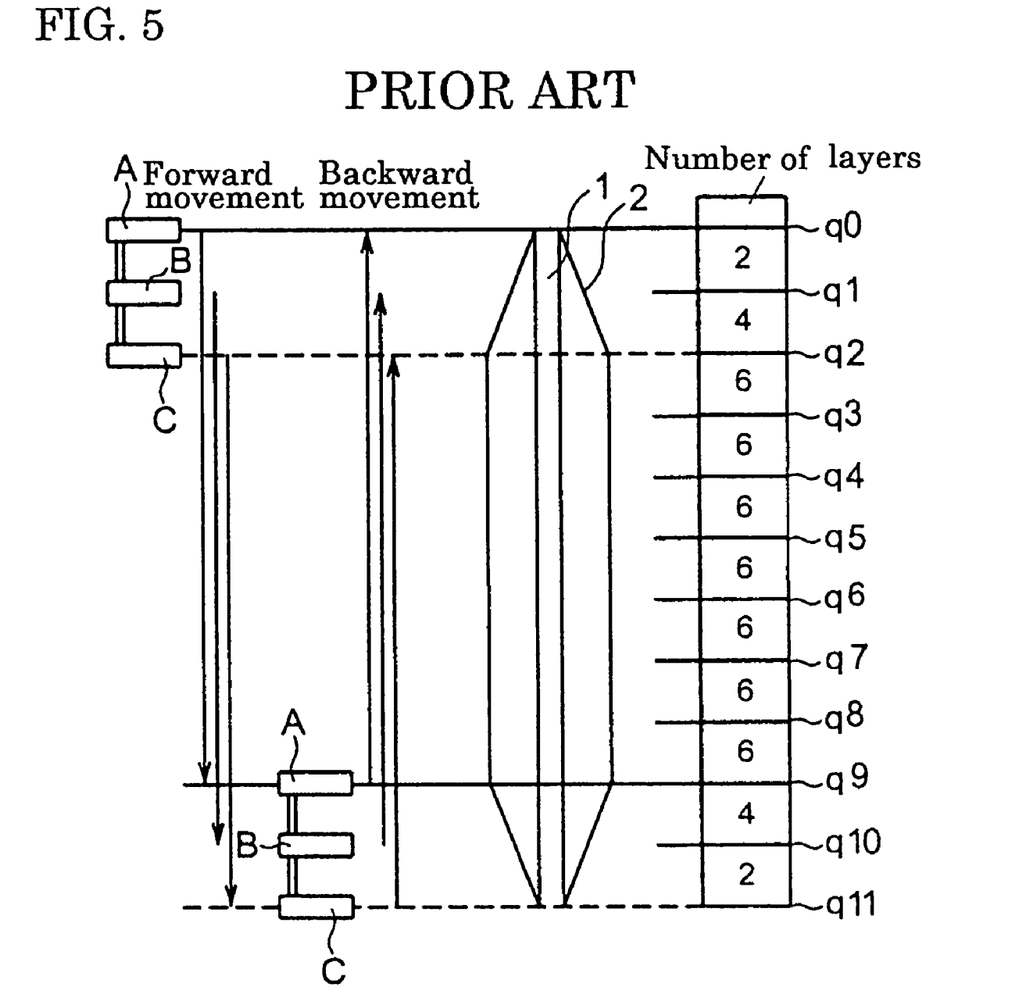
FIG. 5 is a conceptual diagram showing a multiburner OVD method.

To improve the production speed of a glass-particle-deposited body in the OVD method, a method using a plurality of burners is known. This method is known as "a multiburner OVD method." FIG. 5 is a conceptual diagram showing the multiburner OVD method. In FIG. 5, the numeral "1" indicates a starting member, and "2" indicates a glass-particle-deposited body being formed by the deposition of glass particles on the starting member 1. Burners A to C constitute a burner row. In FIG. 5, the movement of the burner row from above downward is referred to as the forward movement, and the movement from below upward as the backward movement. In the multiburner OVD method, the glass-particle-deposited body 2 is produced by ejecting a flame including glass particles from the burner toward the starting member 1 while the burner row and the starting member 1 are being moved reciprocatively relative to each other. To perform the relative reciprocating movement, either the burner or the starting member 1 may be moved.

The burner row starts its downward movement at a position where the position of the uppermost burner A in the burner row faces the uppermost position q0 in the glass-particle deposition range on the starting member 1. It reverses its moving direction at a position where the position of the lowermost burner C in the burner row faces the lowermost position q11 in the glass-particle deposition range and moves upward to return to the original position. The burner row repeats this cycle of movement. Consequently, the individual burners perform the relative reciprocating movement in their respective predetermined ranges on the glass-particle-deposited body 2. More specifically, the burner A moves between the positions q0 and q9, the burner B between the positions q1 and q10, and the burner C between the positions q2 and q11.

The column in the right-hand side of FIG. 5 shows the number of layers of the glass particles deposited on the starting member 1 when the burner row performs one reciprocation. When one burner passes once, one glass-particle-deposited layer is formed. Consequently, when one burner performs one reciprocation, two layers are formed. Therefore, the number of glass-particle-deposited layers produced by one reciprocation of the burner row becomes a constant value of six between the positions q2 and q9. The region in which the number of deposited layers becomes a constant value, such as described above, is referred to as a steady portion. In the end portions of the glass-particle-deposited body 2, which are the portions between the positions q0 and q2 and between the positions q9 and q11, the number of deposited layers decreases as the position approaches the end, and a tapered shape is formed. The region in which the number of deposited layers varies with the position, such as described above, is referred to as an unsteady portion. In the multiburner OVD method, the moving distance of the burner row relative to the starting member 1 is longer than the length of the steady portion.

Figure 1:
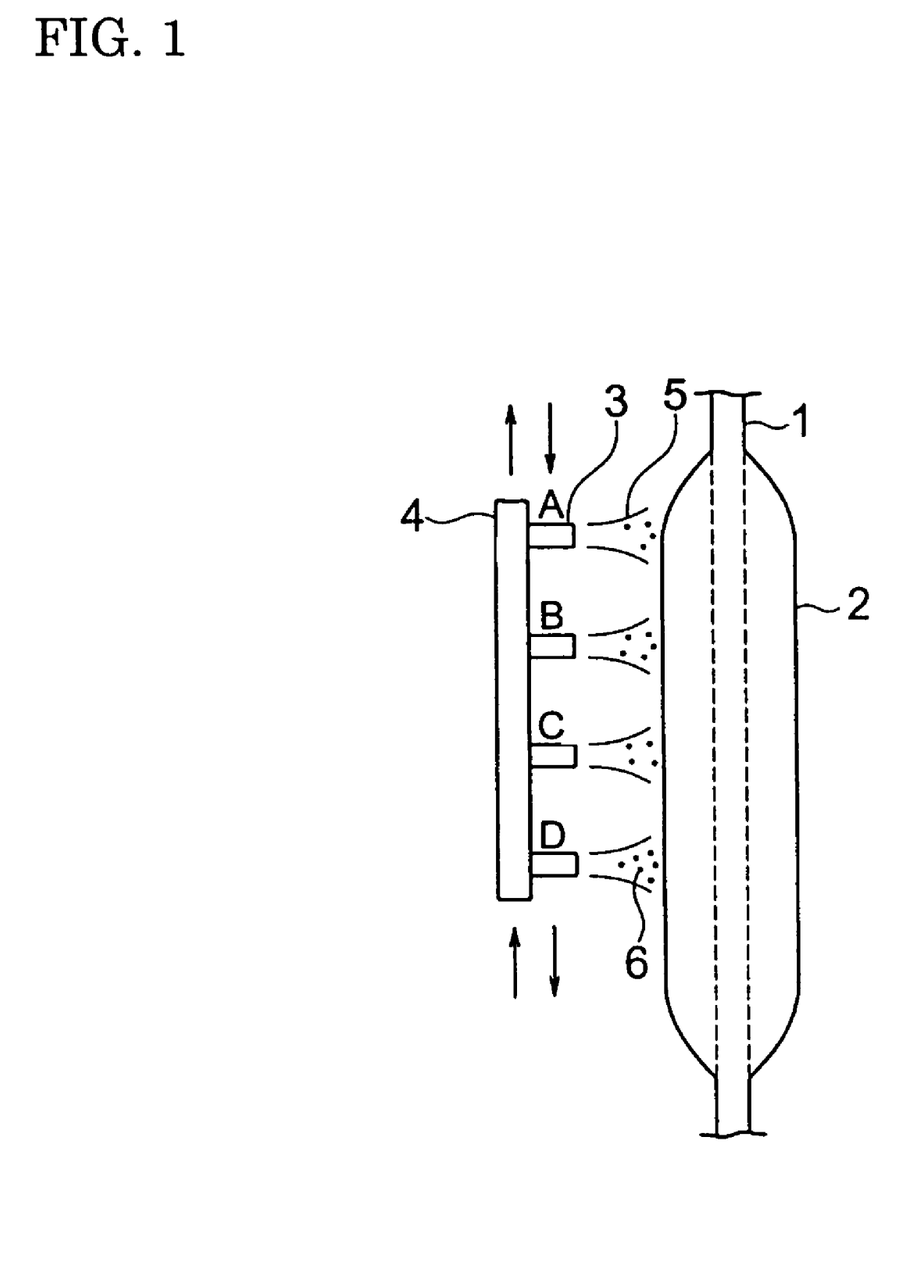
FIG. 1 is a conceptual diagram showing the divisionally synthesizing OVD method, which is one form of the OVD method.

In addition, "the divisionally synthesizing OVD method" is also known in which glass particles are deposited by using a plurality of burners placed at equally spaced intervals to constitute a burner row having a length corresponding to nearly the total length of the starting member. FIG. 1 is a conceptual diagram showing the divisionally synthesizing OVD method. In FIG. 1, the numeral "1" indicates a starting member, "2" a glass-particle-deposited body, and "3" burners (burners A to D). The burners A to D are placed at nearly equally spaced intervals to constitute a burner row 4. The glass-particle-deposited body 2 is produced through the following concurrent operations: the starting member 1 is rotated around its own center axis, the burner row 4 is moved reciprocatively along the length of the starting member 1, and each of the burners 3 ejects a flame 5 including glass particles 6 toward the starting member 1. In the divisionally synthesizing OVD method, the amplitude of the relative reciprocating movement between the starting member 1 and the burner row 4 is shortened, and the predetermined deposition segments on the starting member 1 are allocated to the individual burners 3.

FIG. 1 shows the case where the burner row 4 is moved relative to the starting member 1. Nevertheless, the starting member 1 may be moved relative to the burner row 4. Furthermore, the two members may also be moved relative to each other. In addition, FIG. 1 shows the case where the starting member 1 is held vertically, and accordingly the burner row 4 moves up or down. Nevertheless, the combination of the starting member 1 and the burner row 4 may be positioned at any orientation including the horizontal one to be moved reciprocatively.

In the divisionally synthesizing OVD method in early stages, the burner row 4 was simply moved reciprocatively over nearly the same distance as that of the burner interval. Thus, the deposition segments having a length corresponding to the burner interval on the glass-particle-deposited body 2 were allocated to the individual burners 3. In this case, the reversing position of the reciprocating movement of the burners 3 allows the accumulation of the influence of the increase in the deposition time due to the speed reduction of the burners 3 and the temperature rise at the deposition surface. As a result, variations in the diameter of the glass-particle-deposited body 2 tend to occur.

In order to decrease the diameter variation at the reversing position of the reciprocating movement in the divisionally synthesizing OVD method, "a zigzag method" has been proposed in the published Japanese patent applications Tokukaihei 3-228845 and Tokukaihei 4-260618. In "the zigzag method," the range of the reciprocating movement of the burner row is predetermined to be an integral multiple of the burner interval. In addition, the moving distance in the reciprocating movement of the burner row is designed to be slightly different between the forward and backward movements. The reversing position of the reciprocating movement of the burner row moves successively from the position at the time of the beginning of the synthesizing and returns to the position at the time of the beginning of the synthesizing. This period is referred to as "one set." The "set" is repeated twice or more. In the zigzag method, the reversing position of the reciprocating movement of the burner row is distributed over the starting member. Therefore, the factor causing the diameter variation at the reversing position can be distributed over the entire glass-particle-deposited body. As a result, the diameter variation in the glass-particle-deposited body is suppressed.

In addition, in the case where the reversing position of the reciprocating movement is fixed in the divisionally synthesizing OVD method, in order to decrease the diameter variation at the reversing position, "a condition-adjusting method" has been proposed in the published Japanese patent application Tokuhyou 2001-504426. In "the condition-adjusting method," while the burner row is simply moved reciprocatively over the same distance as that of the burner interval, the deposition condition is adjusted at the reversing position to decrease the diameter variation. This adjustment of the deposition condition specific to the reversing position in the reciprocating movement of the burner row is referred to as "the condition adjustment at the reversing position" in order to distinguish it from the below-described alteration of the deposition condition associated with the growth of the glass-particle-deposited body. Hereinafter in the present specification, the term "the OVD method" includes the multiburner OVD method and the divisionally synthesizing OVD method (the zigzag method and the condition-adjusting method).

In the OVD method, alteration of the deposition condition other than "the condition alteration at the reversing position" is also performed. More specifically, as the diameter and surface area of the glass-particle-deposited body increase, the following alterations are performed:

(1) The distance between the starting member and the burner is widened to prevent the burner from making contact with the glass-particle-deposited body.

(2) The amount of the glass material or glass particles to be fed to the burner is increased to increase the synthesizing rate of the glass particles.

(3) The moving speed of the burner, the amount of the gas discharged from the reaction container for synthesizing the glass-particle-deposited body, and the flow rate of the combustible gas, combustion-assisting gas, and inert gas all to be fed to the burner are adjusted to suppress the cracking of the growing glass-particle-deposited body.

(4) The flow rate of the gas blown on the glass-particle-deposited body is adjusted to adjust the amount of the glass particles being deposited on the starting member.

Hereinafter, the foregoing items (1) to (4) are integrated into the expression "the alteration of the deposition condition associated with the growth of the glass-particle-deposited body," which is shortened to "the alteration of the deposition condition."

If any of the alteration of the deposition condition from (1) to (4) above is performed during the production process, in particular, in the cases where the relative position between the burner and the starting member is fixed at the time of the alteration of the deposition condition and where the alteration is performed significantly at a time, the alteration may cause variations in the diameter of the glass-particle-deposited body and variations in optical properties of the glass preform obtained by consolidating the glass-particle-deposited body.

In the multiburner OVD method, the alteration of the deposition condition is generally performed when the burner row is positioned at the reversing position of the reciprocating movement, i.e., by referring to FIG. 5, when the burner A is positioned at the position q0 (the burner B at the position q1 and the burner C at the position q2) and when the burner A is positioned at the position q9 (the burner B at the position q10 and the burner C at the position q11). This procedure enables the production of an excellent-quality glass-particle-deposited body 2 having small variations in the diameter at the portion other than the unsteady portion and bulk density. For example, the published Japanese patent application Tokukai 2000-44276 has stated that it is not desirable to alter the gas flow rate while the burner is positioned at the steady portion of the glass-particle-deposited body because the glass-particle-deposited body may include gas bubbles and other imperfections.

In this method, however, when the alteration of the deposition condition is performed, either the burner C is positioned at the position q2 or the burner A is positioned at the position q9 as a matter of course. This condition concentrates the influence of the alteration of the deposition condition at the boundary portions between the steady portion and unsteady portion of the glass-particle-deposited body 2 (the positions q2 and q9). As a result, the diameter variation and the like due to the alteration of the deposition condition tend to spread toward the steady portion from the positions q2 and q9. This tends to shorten the uniform-diameter portion of the glass-particle-deposited body 2, reducing the product yield and hampering the productivity.

In the divisionally synthesizing OVD method, all burners except the burners at the ends of the burner row are positioned at the steady portion at all times. Therefore, it is impossible to implement the method in which the alteration of the deposition condition is performed only when the burner is positioned at the unsteady portion. In particular, in the zigzag method, the alteration of the deposition condition is performed at the end of "the set." In this case, the alteration of the deposition condition is performed invariably at the position where the burner row is positioned at which the synthesizing is started. Therefore, the disturbance in the deposition of glass particles due to the alteration of the deposition condition is concentrated at specific positions of the glass-particle-deposited body. Consequently, the specific positions suffer variations in the diameter and disturbances in the optical property in many cases. This undesirable circumstance has required to establish a method of producing a glass-particle-deposited body having a small diameter variation and excellent quality. In the above-described published Japanese patent application Tokukaihei 4-260618, no description has been given on the alteration of the deposition condition.

Patent literature 1: the Japanese patent application Laid open No. Hei 3-228845

Patent literature 2: the Japanese patent application Laid open No. Hei 4-260618

Patent literature 3: the Japanese patent application Laid open No. 2000-44276

Patent literature 4: the Japanese patent application Laid open No. 2001-504426

DISCLOSURE OF THE INVENTION

Problem to be Solved by the Invention

An object of the present invention is to offer a method of producing a glass-particle-deposited body having a longitudinally uniform shape with a small diameter variation.

Means for Solving the Problem

To attain the foregoing object, the present invention offers a method of producing a glass-particle-deposited body by performing the following concurrent operations: causing a burner row comprising a plurality of burners to perform reciprocating movement relative to a starting member, causing each of the burners to form a flame including glass particles, and causing the glass particles to be deposited on the starting member. In this method, the condition for the deposition is altered at least twice during the course of the deposition process such that the interval between adjacent burner positions among the burner positions at which the deposition condition is altered is shorter than the interval between adjacent burners. In the above description, "the alteration of the deposition condition" means the alteration of the condition performed in response to the growth of the glass-particle-deposited body and does not include the alteration of the condition performed to respond to the speed reduction of the burner to be conducted at the turning points in the reciprocating movement of the burner.

It is desirable that the deposition condition to be altered be at least one member selected from the group consisting of the flow rate of the combustible gas, the flow rate of the combustion-assisting gas, and the flow rate of the glass material all to be fed to the burner, more desirably the flow rate of the combustible gas. Each of the burners may perform reciprocating movement relative to the starting member within the range of a part allocated to each of the burners in the region for depositing glass particles on the starting member. Each of the burners may also perform reciprocating movement relative to the starting member between two specific positions predetermined to each of the burners with respect to the starting member. In addition, the deposition condition may be altered when the burners are positioned between turning points in the reciprocating movement.

Effect of the Invention

A glass-particle-deposited body that has a small diameter variation can be obtained.

BRIEF DESCRIPTION OF THE DRAWING

FIGS. 2(a) and 2(b) are conceptual diagrams showing a first embodiment of a method of producing a glass-particle-deposited body of the present invention, in which

FIGS. 3(a) and 3(b) are conceptual diagrams showing a third embodiment of a method of producing a glass-particle-deposited body of the present invention, in which

EXPLANATION OF THE SIGN

1: Starting member
2: Glass-particle-deposited body
3: Burner
4: Burner row
5: Flame
6: Glass particles

BEST MODE FOR CARRYING OUT THE INVENTION

Embodiments of the present invention are explained below by referring to the accompanying drawing. The drawing is intended to explain the invention, not to limit the scope of the claims. To avoid duplicated explanations, in the drawing, the same reference signs refer to similar elements. The ratio of dimensions in the drawing does not necessarily coincide with that of actual dimensions.

First Embodiment

Figure 2A:
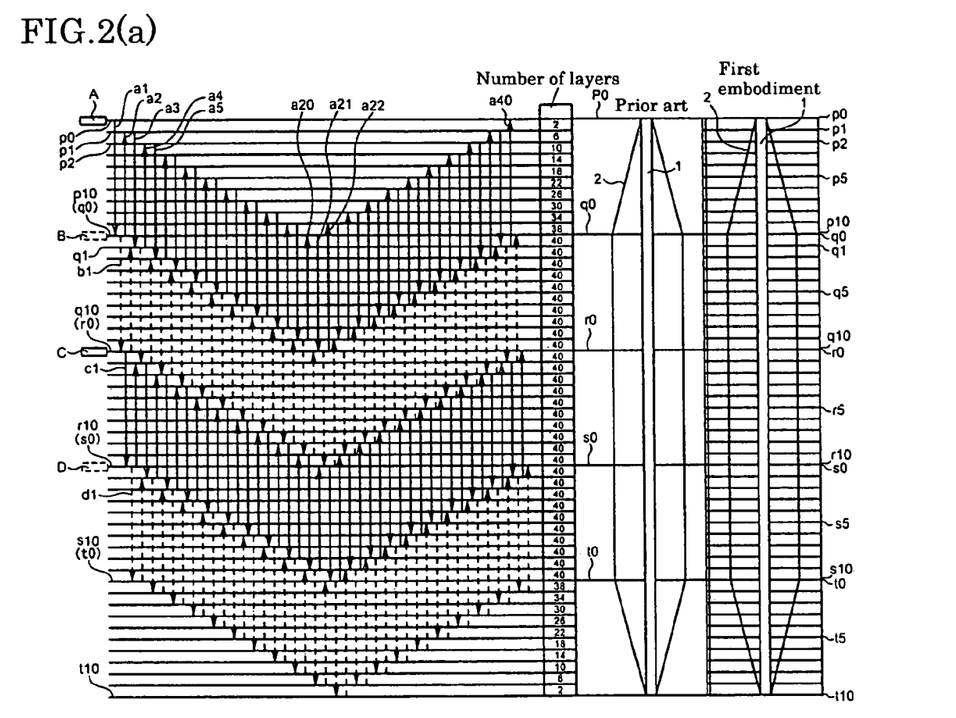
FIG. 2(a) shows a moving pattern of the burner and the number of glass-particle layers at individual positions of the glass-particle-deposited body and FIG. 2(b) shows the alteration of the deposition condition.
Figure 2B:
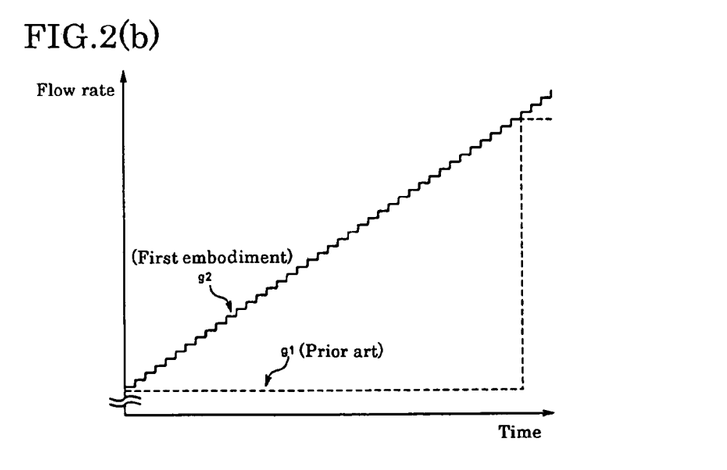

FIGS. 2(a) and 2(b) are conceptual diagrams showing a first embodiment of a method of producing a glass-particle-deposited body of the present invention. FIG. 2(a) shows a moving pattern of the burner and the number of glass-particle layers at individual positions of the glass-particle-deposited body, and FIG. 2(b) shows the alteration of the deposition condition. The first embodiment is an example in which a method of producing a glass-particle-deposited body of the present invention is applied to "the zigzag method" of the divisionally synthesizing OVD method. In this case, each of the multiple burners moves reciprocatively relative to the starting member within the range of a part of the region of the starting member to which the glass particles are deposited. The glass-particle-deposited body is produced with the structure shown in FIG. 1, in which the burners are placed at intervals of 200 mm. Hereinafter, in FIG. 2(a), the movement of the burner row from above downward is referred to as the forward movement, and the movement from below upward as the backward movement.

In FIG. 2(a), the horizontal lines at positions p0 to t10 correspond to the individual longitudinal positions of the starting member 1 and the glass-particle-deposited body 2. For example, the horizontal lines at the positions p0 and t10 represent the upper-end and lower-end positions of the glass-particle-deposited body 2, respectively. In addition, in FIG.

2(a), arrows a1 to a40 and the like show the way the burners move. For example, the arrow a1 shows that the burner A moves from the position p0 to the position p10 (position q0) on the starting member 1. The number of glass-particle layers is shown by the numerical values in the column under the heading "Number of layers."

The moving pattern of the burner row shown in FIG. 2(a) is explained below in detail. In FIG. 2(a), the burner A, whose starting position is the position p0, moves 200 mm downward (arrow a1) to the position p10 (position q0), which is the starting position of the burner B. Then, the burner A turns around to move 180 mm upward (arrow a2) to the position p1. It turns around at the position p1 to move 200 mm downward (arrow a3) to the position q1. It turns around there to move 180 mm upward (arrow a4) to the position p2. Subsequently, the burner A repeats the returning movement having a forward moving distance of 200 mm and a backward moving distance of 180 mm as shown by arrows a5 to a21 in FIG. 2(a). Thus, the reversing positions of the reciprocating movement of the burner A are shifted to the positions p10 and q10.

Next, the amount of the movement is changed to the forward moving distance of 200 mm and the backward moving distance of 220 mm. The burner row performs the reciprocating movement along arrows a22 to a40. Accordingly, the reversing positions of the reciprocating movement shift in the backward direction by 20 mm in every reciprocation and finally returns to the positions p0 and q0. The burners B to D move together with the burner A as integrated members (for example, when the burner A moves along the arrow a1, the burner B moves along an arrow b1, the burner C along an arrow c1, and the burner D along an arrow d1). Thus, they move with a pattern similar to that of the burner A. In other words, their reversing positions of the reciprocating movement first shift in the forward direction by 200 mm and then shift in the backward direction by 200 mm to return to the original positions.

In the case of the burner A, a series of movements as shown by the arrows a1 to a40 in FIG. 2(a) represents one set. The set is performed once or repeated at least twice to produce a glass-particle-deposited body. After the set is performed once or repeated at least twice, the glass-particle-deposited body 2 has a nearly uniform diameter within the range of the positions q0 to t0, as shown in FIG. 2(a). The range of the positions p0 to p1 and the range of the positions t0 to t10 are the unsteady portions. The range of the positions q0 to s10 is the steady portion. The reversing positions of the burners are distributed over the entire glass-particle-deposited body 2.

In the first embodiment, the deposition condition is altered at least twice during the course of the deposition process such that the interval between adjacent burner positions among the burner positions at which the deposition condition is altered is shorter than the interval between adjacent burners. More specifically, as the production of the glass-particle-deposited body 2 proceeds, the deposition condition (in this case, the flow rate of the combustible gas) is altered every time the burner row is positioned at the reversing position. FIG. 2(b) is a graph in which the horizontal axis represents time and the vertical axis represents the flow rate of the combustible gas to be fed to the burner. The solid line shows an example of the pattern of the alteration of the flow rate of the combustible gas in the first embodiment, and the broken line shows that in a prior art. The horizontal axis in FIG. 2(b) corresponds to the horizontal axis in FIG. 2(a). For example, an arrow "an" in FIG. 2(a) corresponds to the n-th horizontal portion from the left in the solid line, g2. In other words, the horizontal portion in the solid line g2 shows the period in which the burner is moving. During this period, the flow rate of the combustible gas is not altered practically. The length of the vertical portion in the solid line g2 shows the increment in the flow rate of the combustible gas when the burner's movement is reversed.

In the first embodiment, the flow rate of the combustible gas is increased in small amounts in the shape of a staircase every time the burner's movement is reversed. The positions of the burner at the time of the reversing of the burner movement in relation to the starting member 1 or the glass-particle-deposited body 2 are shown as the positions p0 to t10 in the diagram under the heading of "First embodiment" at the right-hand side of FIG. 2(a). These positions illustrate that the flow rate of the combustible gas is altered in small amounts at a multitude of distributed positions separated at intervals of 20 mm above the starting member 1.

On the other hand, in the prior art, as shown in the broken line, g1, in FIG. 2(b), the alteration of the deposition condition is performed by one operation at the end of one set of the reciprocating movement of the burner row, i.e., when the burner row returns to the original position. Therefore, the amount of the alteration of the deposition condition performed at a time must be larger than that in the first embodiment.

Furthermore, in the prior art, the positions of the burners at the time when the alteration of the deposition condition is performed are always the same in relation to the starting member 1. In this case, the positions of the burners in relation to the starting member 1 are shown as "Prior art" in FIG. 2(a). In the prior art, the alteration of the deposition condition is performed only when the burners are positioned at the positions p0, q0, r0, s0, and t0. Consequently, the influence of the alteration of the deposition condition concentrates at the individual positions at which the deposition condition has been altered. As a result, variations in the diameter and optical property of the glass-particle-deposited body 2 tend to increase at these positions.

In addition, in the prior art, the alteration of the deposition condition is performed when the burner comes to the boundary portions between the steady portion and unsteady portion of the glass-particle-deposited body 2, i.e., the position p10 (position q0) and the position s10 (position t0) in FIG. 2(a). The boundary portion between the steady portion and unsteady portion is a starting point of the tapered shape of the unsteady portion and is inherently subject to diameter variation. Consequently, if the alteration of the deposition condition is performed at this portion, the diameter variation tends to spread toward the steady portion, shortening the uniform-diameter portion. As a result, the product yield is decreased, and accordingly the productivity is reduced. On the other hand, the first embodiment does not concentrate the alteration of the deposition condition at the time the burner is positioned at the boundary portion between the steady portion and unsteady portion. As a result, the diameter variation can be suppressed from spreading toward the steady portion. Finally, the product yield can be improved.

As shown by the solid line g2 in FIG. 2(b), the number of times the alteration of the deposition condition is performed is increased, and accordingly the amount of the alteration of the deposition condition performed at a time is decreased. This procedure enables the reduction in the influence of the alteration of the deposition condition performed at a time. Furthermore, the alteration of the deposition condition is performed every time the reciprocating movement of the burner row is reversed. This procedure can distribute over the glass-particle-deposited body 2 the influence of the variation in the glass-particle deposition due to the condition alteration. As a result, it is possible to obtain the glass-particle-deposited body 2 having a small diameter variation as a whole.

In addition, in the multiburner OVD method, it is possible to suppress the diameter variation generated by the concentration of the influence of the alteration of the deposition condition at the boundary portion between the steady portion and unsteady portion. Consequently, the length of the uniform-diameter portion can be increased. As a result, the product yield can be improved when, for example, the glass-particle-deposited body 2 is used as an optical fiber preform or its intermediate product is formed by producing a glass component.

In the first embodiment, the deposition condition is altered every time the burner's movement is reversed. Nevertheless, in the method of producing a glass-particle-deposited body of the present invention, provided that the interval between burner positions at the time of the alteration of the deposition condition is distributed over the starting member at an interval shorter than the interval between burners, the number of times the alteration of the deposition condition is performed may be fewer than the number of times the burner turns around. In addition, the distance at which the reversing position of the reciprocating movement of the burner row is shifted is not limited to 2 cm. It may be modified as appropriate. For example, it may be increased within the range that permits the production of the glass-particle-deposited body with a desired quality.

If the interference of the flame occurs between adjacent burners, the state of the deposition of the glass particles becomes unstable. Therefore, it is desirable that the interval between burners be at least 100 mm or so. Accordingly, it is desirable that the burner positions at the time of the alteration of the deposition condition be distributed over the starting member at intervals shorter than 100 mm, more desirably at most 60 mm, particularly desirably at most 25 mm. It is desirable that the interval be narrow.

It is sufficiently possible to perform the alteration of the deposition condition by distributing the burner positions at the time of the alteration of the deposition condition over the starting member at intervals of 20 mm (this interval is shown, for example, as the interval between the positions pn and pn+1 in the diagram of the first embodiment at the right-hand side of FIG. 2(a)). In view of the accuracy of the controlling device, it is possible to employ a value of 10 or 5 mm as the interval between burner positions at the time of the alteration of the deposition condition (this interval is referred to as the distributed interval). Based on the above consideration, it is possible to properly determine the distributed interval according to the capability of the equipment for producing the glass-particle-deposited body.

In the first embodiment, as the alteration of the deposition condition, the flow rate of the combustible gas is altered. However, the deposition condition to be altered may be at least one member selected from the group consisting of the flow rate of the combustible gas, the flow rate of the combustion-assisting gas, and the flow rate of the glass material all to be fed to the burner. When the flow rate of the combustible gas is altered, it is desirable that the amount of the alteration of the deposition condition performed at a time be at most 2 SLM (the quantity of flow per minute under the standard condition), more desirably at most 1 SLM. By reducing the amount of the alteration of the deposition condition performed at a time to the smallest possible value, it becomes possible to decrease the diameter variation in the glass-particle-deposited body 2. In addition, in the case where the flow rate of the combustible gas is altered every time the burner row is positioned at the reversing position of the reciprocating movement, even when the amount of the alteration performed at a time is reduced to a value as small as 0.3 SLM, the performing of the alteration 40 times enables an alteration of 12 SLM per set. Thus, sufficient alteration of the deposition condition can be performed for the deposition of glass particles.

Second Embodiment

A second embodiment is an example in which a glass-particle deposition method of the present invention is applied to "the condition-adjusting method" of the divisionally synthesizing OVD method. In this case, each of the multiple burners moves reciprocatively relative to the starting member between two specific positions predetermined to each of the burners with respect to the starting member. The alteration of the deposition condition is performed by distributing the burner positions at the time of the alteration of the deposition condition over the starting member at desired intervals.

For example, it is assumed that, as shown in FIG. 1, four burners are placed at intervals of 200 mm to constitute a burner row, and the burner row performs a simple reciprocating movement with a forward movement of 200 mm and a backward movement of 200 mm. When the alteration of the deposition condition is performed at the time the burner comes to positions 0, 20, 40, ..., 180, and 200 mm from one end of the reciprocating movement both for the forward and backward movements, the positions at which the alteration of the deposition condition is performed can be distributed over the starting member at the same intervals as those in the first embodiment. In the condition-adjusting method also, not all burners are positioned at the unsteady portion. Consequently, when the present invention is applied, it is possible to produce a glass-particle-deposited body having a small diameter variation due to the alteration of the deposition condition and excellent optical properties.

Examples of Modification of the First and Second Embodiments

In the divisionally synthesizing OVD method, it is possible to employ a method in which the deposition condition is altered on the basis of time. When time is used as the basis, the alteration of the deposition condition is easy performed without regard to the method of reciprocating movement such as whether the reversing position of the reciprocating movement is distributed or not. In addition, by further shortening the interval between alterations of the deposition condition, it becomes possible to distribute the burner positions at the time of the increase in the flow rate of the combustible gas over the starting member at further shortened intervals. It is also possible to further decrease the amount of the alteration of the deposition condition performed at a time. Furthermore, it is possible to implement a control method that does not concentrate the alteration of the deposition condition at specific positions on the starting member. For example, in the case of "the condition-adjusting method," when a speed of 200 mm/min is employed for the reciprocating movement, by performing the alteration of the deposition condition at intervals of six seconds, i.e., six seconds later, 12 seconds later, and so on from one end of the reciprocating movement, the burner positions at the time of the alteration of the deposition condition can be distributed at intervals of 20 mm.

The method of altering the deposition condition on the basis of time can control the pattern of the alteration of the deposition condition independently of the pattern of the shifting of the reversing position of the relative reciprocating movement. Consequently, even when a situation occurs in which the optimum shifting pattern of the reversing position for suppressing the diameter variation specific to the reversing position is different from the optimum controlling pattern of the deposition condition for suppressing the diameter variation due to the alteration of the deposition condition, both can be controlled optimally.

Third Embodiment

Figure 3A:
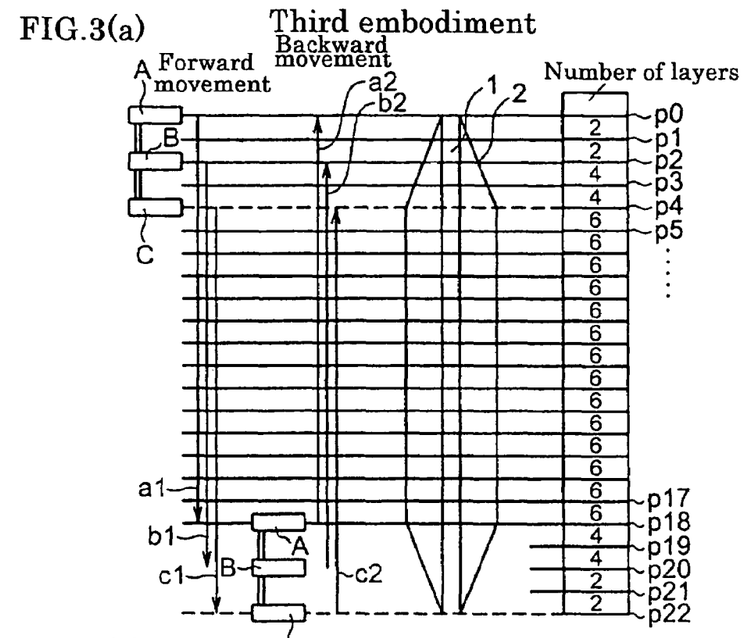
FIG. 3(a) shows a moving pattern of the burner and the number of glass-particle layers at individual positions of the glass-particle-deposited body and FIG. 3(b) shows the alteration of the deposition condition.
Figure 3B:
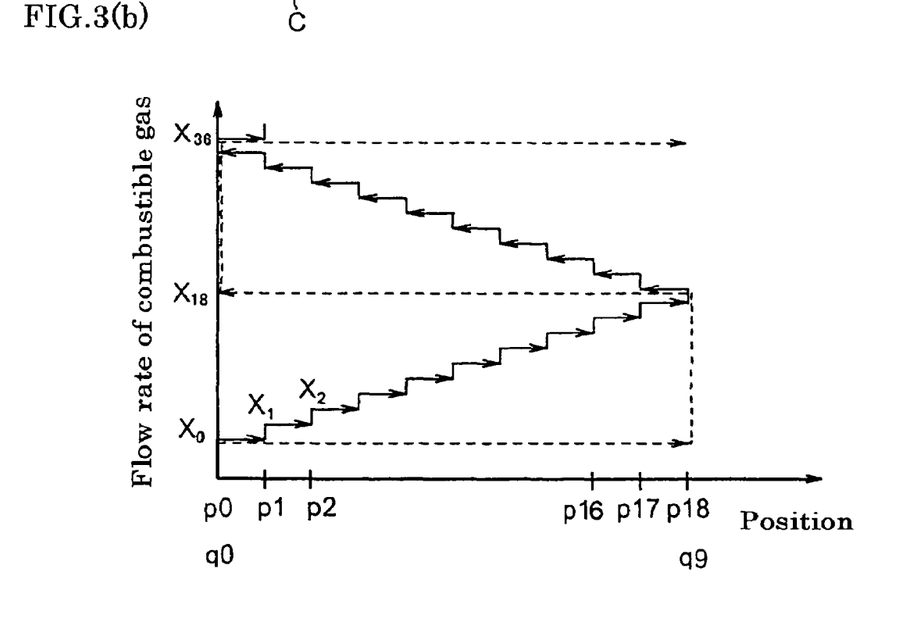

A third embodiment is an example in which a method of producing a glass-particle-deposited body of the present invention is applied to "the multiburner OVD method." FIGS. 3(a) and 3(b) are conceptual diagrams showing the third embodiment of a method of producing a glass-particle-deposited body of the present invention. FIG. 3(a) shows a moving pattern of the burner and the number of glass-particle layers at individual positions of the glass-particle-deposited body, and FIG. 3(b) shows the alteration of the deposition condition. In a concrete example of the third embodiment, three burners A to C are placed at intervals of 100 mm to constitute a burner row. The alteration of the deposition condition is performed when the burner A is positioned at each of the positions p0 to p18 to distribute the alteration. In addition, the amount of the alteration performed at a time is set to be small.

An explanation is given below by citing an example in which the alteration of the deposition condition is represented by the increase in the flow rate of the combustible gas to be fed to the burner. FIG. 3(b) is a graph in which the horizontal axis represents the position of the burner A and the vertical axis represents the flow rate of the combustible gas to be fed to the burner. The solid line shows a pattern of the alteration of the flow rate of the combustible gas in the third embodiment, and the broken line shows that in a prior art.

In the third embodiment, the burner A starts its movement from the position p0, which is located at a one-end side of the starting member, toward the other end of the starting member. The flow rate of the combustible gas is held constant at X0 from the position p0 to the position p1 and is increased to X1 at the position p1. Similarly, it is held constant at X1 from the position p1 to the position p2 and is increased to X2 at the position p2. The foregoing variation in the flow rate of the combustible gas is repeated until the burner A travels to the reversing position p18. After the flow rate of the combustible gas is increased to X18 at the position p18, the burner A turns around to move leftward in FIG. 3(b). As with the forward movement, the burner movement and the increase in the flow rate of the combustible gas are performed repeatedly until the burner A returns to the position p0. The other burners B and C also have the same moving pattern in relation to the starting member and the same increasing pattern of the flow rate of the combustible gas as those of the burner A, although their starting position in relation to the starting member is different.

On the other hand, in the prior art, the flow rate of the combustible gas is held constant at X0 from the initial position q0 in FIG. 5 to the position q9, which is the other end of the range of the burner movement. When the burner arrives at the position q9, the flow rate is increased to X18. Subsequently, the flow rate of the combustible gas is held constant at X18 from the position q9 to the position q0. When the burner arrives at the position q0, the flow rate is increased to X36.

FIG. 3(b) shows the case in which the flow rate of the combustible gas is increased on the basis of the burner position in relation to the starting member. Such an alteration pattern of the deposition condition can also be achieved by altering the deposition condition nearly every fixed time, as in the modified examples of the first and second embodiments. Whichever of the position or the time is used as the basis, the burner position at the time of the alteration of the deposition condition can be distributed over the entire glass-particle-deposited body.

In the case where the same amount of increase in the flow rate of the combustible gas to be fed to the burner is employed for one reciprocation of the burner, whereas the prior art needs to perform a large amount of increase in the flow rate of the combustible gas when the burner is positioned at q0 and q9, the third embodiment distributes the burner position at the time of the alteration of the deposition condition over the entire glass-particle-deposited body and consequently can decrease the amount of variation in the flow rate of the combustible gas performed at a time. As a result, the third embodiment can prevent the influence of the alteration of the deposition condition from concentrating at specific positions to decrease the diameter variation and other imperfections. Finally, it can secure a broad range of the steady portion to improve the product yield.

The reason why the third embodiment enables the alteration of the deposition condition that has been stated to be undesirable in the above-described Tokukai 2000-44276 is attributable to the following causes. In the third embodiment, even when the deposition condition (for example, the flow rate of the combustible gas to the burner) is altered in the steady portion of the glass-particle-deposited body, the burner positions at the time of the alteration of the deposition condition are distributed over the entire glass-particle-deposited body at short intervals. This distribution suppresses the local variations in the bulk density distribution of the glass-particle-deposited body, the actually deposited quantity of the glass particles, and the like. Consequently, in a degassing step to be carried out in the consolidation process, there exists no local variation in the degassed state. As a result, a consolidated glass body free from remaining gas bubbles can be obtained.

Fourth Embodiment

Figure 4:
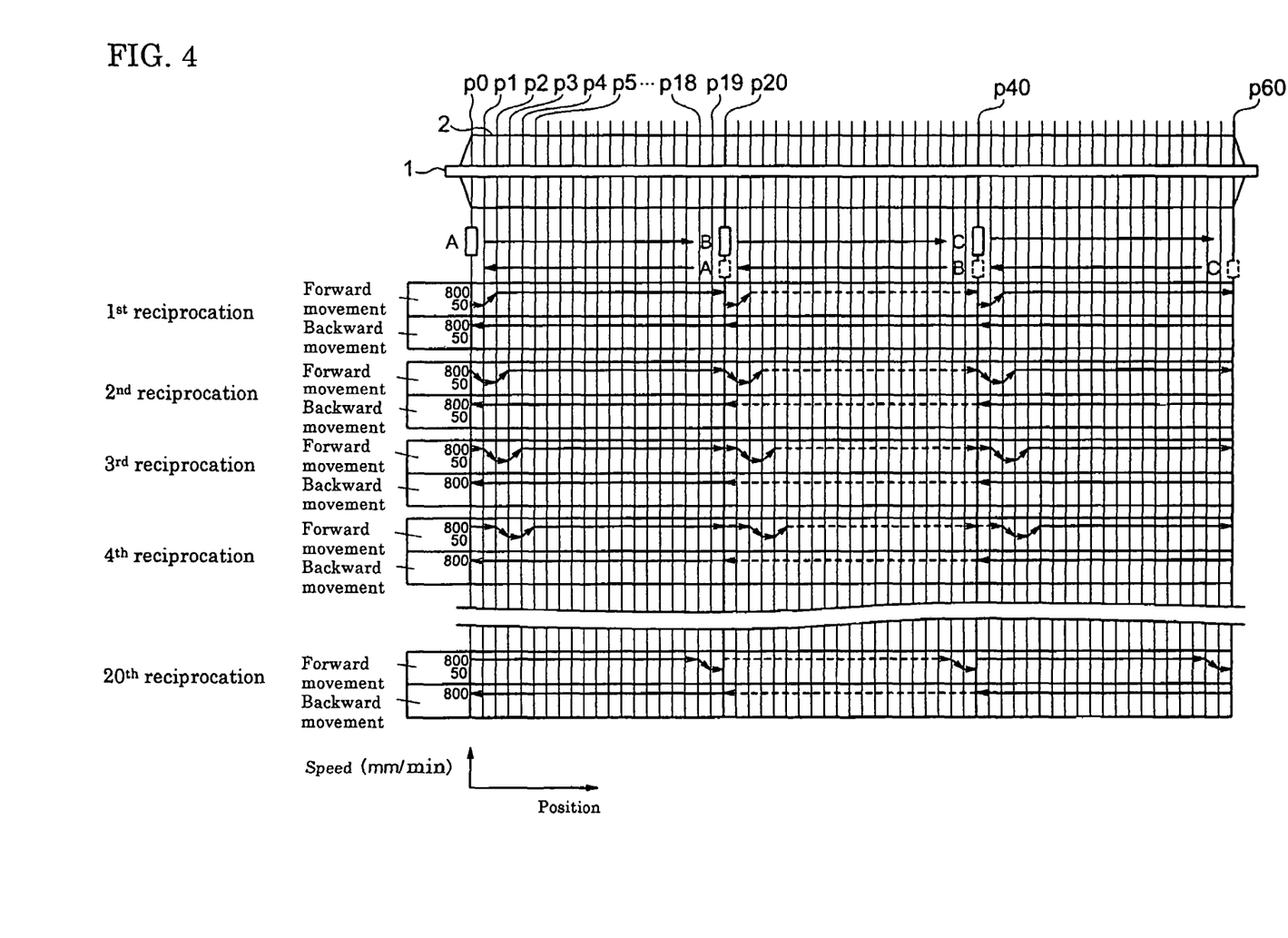
FIG. 4 is a conceptual diagram showing a fourth embodiment of a method of producing a glass-particle-deposited body of the present invention.

In a fourth embodiment, speed reduction sections are provided at positions other than the turning points in the reciprocating movement. Then, the alteration of the deposition condition is performed when the burner is positioned in the speed reduction section. FIG. 4 is a conceptual diagram showing the fourth embodiment of a method of producing a glass-particle-deposited body of the present invention. In a concrete example of the fourth embodiment, three burners A to C are placed at intervals of 200 mm to constitute a burner row. The burner row moves reciprocatively along the length of the starting member with an amplitude of 200 mm. At the same time, glass particles are blown to the rotating starting member to produce a glass-particle-deposited body. During this operation, while the burner is moving, the moving speed is reduced temporarily to alter the deposition condition in the speed reduction section. In FIG. 4, the horizontal axis represents the position of the burner and the vertical axis represents the moving speed. In FIG. 4, the distance between the positions p0 and p20 is 200 mm and the distance between the positions pn and pn+1 is 10 mm.

When attention is focused on the burner A, in the first reciprocation, it moves the first 10 mm (position p0 to p1) at a speed of 50 mm/min, accelerates to 800 mm/min during the next 10 mm (position p1 to p2), and subsequently moves to the reversing position p20 at 800 mm/min. Then, it returns to the original position p0 at a speed of 800 mm/min without reducing the speed. In the second reciprocation, it starts moving at a speed of 800 mm/min from the original position p0, decelerates to 50 mm/min while moving 10 mm (position p0 to p1), moves the next 10 mm (position p1 to p2) at a speed of 50 mm/min, increases the speed from 50 mm/min to 800 mm/min while moving the next 10 mm (position p2 to p3), and subsequently moves to the reversing position at a speed of 800 mm/min. Then, it moves at a speed of 800 mm/min to return to the original position p0.

As described above, the moving speed of the burner A is set at 50 mm/min for the predetermined range (low-speed-moving range) of 10 mm. The burner is moved at 800 mm/min in the ranges outside the additional 10 mm provided at both sides of the low-speed-moving range. The low-speed-moving range, in which the burner is moved at 50 mm/min, is successively moved every time the burner performs one reciprocating movement in relation to the starting member. The low-speed-moving range lies between the positions p0 and p1 at the first reciprocation, between the positions p1 and p2 at the second reciprocation, and between the positions p19 and p20 at the 20th reciprocation. According to this method, the range in which the burner moves at low speed moves over the entire starting member in 20 reciprocations, which constitute one unit.

In the conventional divisionally synthesizing OVD method, the temperature at the deposition surface becomes high at the reversing position of the reciprocating movement. On the other hand, in the fourth embodiment, the temperature at the deposition surface becomes higher in the low-speed-moving range than at the reversing position of the reciprocating movement. Because the low-speed-moving range is distributed nearly uniformly over the entire glass-particle-deposited body, the influence of the temperature rise generated at the reversing position of the reciprocating movement of the burner becomes slight. Therefore, it is possible to suppress the diameter variation specific to the reversing position.

Furthermore, the condition for synthesizing the glass particles is altered every time the burner passes the low-speed-moving range. For example, because the amount of the alteration of the glass material at a time is set to be small, it is possible to produce a glass-particle-deposited body having a small diameter variation and excellent quality.

In this method of reciprocating movement also, either the burner or the starting member may be moved reciprocatively in the relative movement. In addition, the low-speed-moving range may be provided in the backward movement in place of the forward movement. Furthermore, a plurality of low-speed-moving ranges may be provided in one reciprocating movement. The speed of the reciprocating movement may also be predetermined as appropriate. In performing the deposition of glass particles on the starting member while the burner is conducting the relative reciprocating movement, the spacing between low-speed-moving ranges, the number of times that the low-speed-moving range appears, and the speed of the reciprocating movement may be adjusted on an as-needed basis so that the temperature at the deposition surface can become higher in the range in which the burner moves at low speed than at the reversing position of the reciprocating movement.

In the above-described method of reciprocating movement, the burner position in relation to the starting member at the time of the alteration of the deposition condition may also be based on time in place of the low-speed-moving range. The fourth embodiment distributes the burner position at the time of the increase in the amount of the combustible gas over the entire glass-particle-deposited body at intervals of 10 mm and consequently achieves the decrease in the amount of the increase in the combustible gas performed at a time. As a result, the influence of the alteration of the deposition condition can be prevented from concentrating at specific positions on the glass-particle-deposited body. Finally, the fourth embodiment can produce a glass-particle-deposited body having a small diameter variation and high quality.

In any of the embodiments, it is also desirable that the alteration of the deposition condition of the present invention be performed by predetermining both the burner position at the time of the alteration of the condition and the number of times that the condition is altered so that the amount of variation for each alteration of the condition can become equal to or less than the specified amount and by carrying out the alteration of the condition according to the predetermined results. In addition, the alteration of the deposition condition of the present invention may be performed either concurrently on a plurality of burners or individually on each of the burners when the alteration regards relation to the glass particles, glass material, combustible gas, combustion-assisting gas, and inert gas all to be fed to the burner, the distance between the starting member and the burner, or the position upon which the glass particles ejected from the burner impinge on the starting member.

EXAMPLE 1

The moving pattern of the burner is the same as that in the concrete example of the fourth embodiment. The flow rate of the combustible gas to be fed to the burner is increased by 0.15 SLM every time the burner passes the low-speed-moving range. The burner position when the flow rate of the combustible gas is increased is distributed along the length of the glass-particle-deposited body at intervals of 10 mm. The reciprocating movement of the burner is performed 600 times. The obtained glass-particle-deposited body has a length of the steady portion of 430 mm and a diameter of 180±1.5 mm. The glass-particle-deposited body has a good shape at the tapered portion at both ends without showing deformation.

In Example 1, the low-speed-moving range is uniformly distributed along the length of the glass-particle-deposited body. Because the moving speed of the burner at the outside of the low-speed-moving range is 800 mm/min, the number of glass-particle-deposited layers and the average moving speed of the burner are the same at any positions on the steady portion of the glass-particle-deposited body in every 20 reciprocations of the burner. In Example 1, because the reciprocating movement of the burner is performed 600 times, the 20 reciprocations of the burner is performed 30 times. Consequently, even throughout the entire process from the start of the production of the glass-particle-deposited body to the end, the number of glass-particle-deposited layers and the average moving speed of the burner are the same at any positions on the steady portion of the glass-particle-deposited body.

It is practically that the average moving speed of the burner be practically the same at all positions of the steady portion of the starting member or the glass-particle-deposited body, most desirably the same. Nevertheless, a slight variation may be permitted provided that the variation does not cause a large variation in the diameter of the steady portion of the glass-particle-deposited body.

As described above, the employing of the method of the present invention enables the production of a glass-particle-deposited body whose steady portion has a small diameter variation and a long length.

COMPARATIVE EXAMPLE 1

A porous glass-particle-deposited body is produced with the same moving pattern of the burner as that in Example 1.

However, the alteration of the flow rate of the combustible gas is performed by increasing it by 0.075 SLM every time the burner reverses its movement. The reciprocating movement of the burner is performed 600 times. The obtained glass-particle-deposited body has a length of 700 mm, in which the steady portion has a length of 400 mm. The average value of the diameter of the steady portion is 180 mm. The diameter at the reversing position of the burner on the steady portion is smaller than the average value by 6 mm. This position is the position at which one of the burners used is positioned when the flow rate of the combustible gas is increased. The unsteady portion at both ends shows partial deformation.

COMPARATIVE EXAMPLE 2

A glass-particle-deposited body is produced with the same moving pattern of the burner as that in Example 1. However, the flow rate of the combustible gas is altered by 3 SLM at the reversing position of the burner every time the burner performs 20 reciprocations. The reciprocating movement of the burner is performed 600 times. The obtained glass-particle-deposited body has nearly the same size as that in Comparative example 1. The diameter at the reversing position of the burner on the steady portion of the glass-particle-deposited body is smaller than the average value of the diameter of the steady portion by 10 mm. The deformation at the unsteady portion at both ends becomes greater than that in the case of Comparative example 1. The length of the uniform-diameter portion of the glass-particle-deposited body is 350 mm. In other words, Comparative example 2 has a lower product yield than that of Comparative example 1.

INDUSTRIAL APPLICABILITY

The present invention enables the production of a glass-particle-deposited body that has a small diameter variation along its length and a long steady portion. Having such features, the body is suitable as an optical fiber preform and its intermediate product.

The invention claimed is:

1. A method of producing a glass-particle-deposited body by performing the concurrent operations of:
   causing a burner row comprising a plurality of burners to perform reciprocating movement relative to a starting member;
   causing each of the burners to form a flame including glass particles; and
   causing the glass particles to be deposited on the starting member,
   wherein for each of the plurality of burners, the condition for the deposition is altered at least twice during the course of the deposition process such that the interval between adjacent burner positions among the burner positions at which the deposition condition is altered is shorter than the interval between adjacent burners.

2. The method of producing a glass-particle-deposited body as defined by claim 1, wherein the deposition condition to be altered is at least one member selected from the group consisting of a flow rate of the combustible gas, a flow rate of the combustion-assisting gas, and a flow rate of the glass material all to be fed to the burner.

3. The method of producing a glass-particle-deposited body as defined by claim 2, wherein the deposition condition to be altered is the flow rate of the combustible gas to be fed to the burner.

4. The method of producing a glass-particle-deposited body as defined by claim 2, wherein the deposition condition is altered when the burners are positioned between turning points in the reciprocating movement.

5. The method of producing a glass-particle-deposited body as defined by claim 2, wherein each of the burners performs reciprocating movement relative to the starting member within the range of a part allocated to each of the burners in the region for depositing glass particles on the starting member.

6. The method of producing a glass-particle-deposited body as defined by claim 5, wherein each of the burners performs reciprocating movement relative to the starting member between two specific positions predetermined to each of the burners with respect to the starting member.

7. The method of producing a glass-particle-deposited body as defined by claim 1, wherein each of the burners performs reciprocating movement relative to the starting member within the range of a part allocated to each of the burners in the region for depositing glass particles on the starting member.

8. The method of producing a glass-particle-deposited body as defined by claim 7, wherein each of the burners performs reciprocating movement relative to the starting member between two specific positions predetermined to each of the burners with respect to the starting member.

9. The method of producing a glass-particle-deposited body as defined by claim 1, wherein the deposition condition is altered when the burners are positioned between turning points in the reciprocating movement.

* * * * *